United States Patent [19]

Elliott et al.

[11] Patent Number: 5,559,993
[45] Date of Patent: Sep. 24, 1996

[54] HARDWARE CIRCUIT FOR SECURING A COMPUTER AGAINST UNDESIRED WRITE AND/OR READ OPERATIONS

[75] Inventors: Thomas E. Elliott, Nepean; Richard L. Gonzalez, Ottawa, both of Canada

[73] Assignee: Her Majesty the Queen in right of Canada, as represented by the Minister of National Defence of Her Majesty's Canadian Government, Ontario, Canada

[21] Appl. No.: 153,164

[22] Filed: Nov. 17, 1993

[30] Foreign Application Priority Data

Mar. 11, 1993 [CA] Canada ................................. 2091501

[51] Int. Cl.[6] ................................................. G06F 13/12
[52] U.S. Cl. ................... 395/490; 395/439; 364/DIG. 1; 364/248.1; 364/246.8; 364/246.9; 380/4
[58] Field of Search .................................. 395/425, 438, 395/439, 479, 490, 185.01; 365/189.01; 364/DIG. 2; 380/4

[56] References Cited

U.S. PATENT DOCUMENTS

| | | | |
|---|---|---|---|
| 4,734,851 | 3/1988 | Director | 395/425 |
| 4,811,293 | 3/1989 | Knothe et al. | 365/189 |
| 5,144,660 | 9/1992 | Rose | 380/4 |

FOREIGN PATENT DOCUMENTS 2045225 12/1991 Canada .
2082916 8/1993 Canada .
WO93/02419 2/1993 WIPO .

*Primary Examiner*—Eddie P. Chan
*Assistant Examiner*—Kevin L. Ellis
*Attorney, Agent, or Firm*—Larson and Taylor

[57] ABSTRACT

A write protect device for a computer comprising a hardware circuit with a switch connected to an internally installed circuit card which has cable connections between data storage device drives and a drive controller cable, the circuit card intercepting control lines used for drive selection and control. The switch is connected to inputs of a latch circuit which, in one position of the switch, generates *READONLY and READONLY signals at outputs of the latch circuit and, in a second position, *DISABLE and DISABLE signals at other outputs. To enter a read only mode, the circuit card includes an inverter and a NAND gate in a *WRITE GATE line to the data storage device drives with one input of the NAND gate being connected to the *READONLY line from the latch circuit which will prevent any *WRITE GATE signal from reaching the data storage device drives when the *READONLY line is activated. A further inverter and a NAND gate intercepts a *DRIVE SEL line to the data storage device drives with the NAND gate having one input connected to the *DISABLE line from the latch circuit. When the *DISABLE line is activated to enter a disable mode, that NAND gate will prevent any *DRIVE SEL signal from reaching an associated data storage device drive. A number of internal optional links and NAND gates on the circuit card can create further selectable operational features.

18 Claims, 4 Drawing Sheets

HARDWARE CIRCUIT FOR SECURING A COMPUTER AGAINST UNDESIRED WRITE AND/OR READ OPERATIONS

FIELD OF THE INVENTION

The present invention is directed to control circuits for Mini- and Personal Computers (PC), which computers have a plurality of means for storing data, and in particular to Hardware Protection Control for Computer Storage Devices (HPCCSD) circuits that will prevent accidental or deliberate interference with previously stored data on data storage devices and infection by malicious codes (virus).

BACKGROUND OF THE INVENTION

The early 1970's created a considerable growth period for both mini-computers and mainframe computers. These type of computers, at that time, were mostly invulnerable to improper access by unauthorized users since they were installed, at least for the most part, in high security computer room environments. However, during the 1980's, the rapid growth of desktop systems, including the many models of IBM-compatible Personal Computers, contributed to open up a whole new domain of computer systems including interconnected world-wide networks which are now in operation. At present, all three "levels" of technology such as the PC's, Mini's and Mainframe computers are networked together. This has resulted in malicious codes, such as viri, being able to create extreme problems for two components of these interconnected systems, i.e. (1) the system central processor(s) and memory: and (2) the system storage devices.

Examination of damage caused by viri and other malicious codes indicates that it is the system storage devices, in particular, which can be the most severely damaged by malicious codes or unauthorized modifications. This is the area where all "data" resides which includes all the user application data (e.g. the database information, financial information, institutional records, etc.); all the application software programs (e.g. the database software, financial software, records management software, etc.) and even the operating system software itself such as MS-DOS. A single incident of contamination by a malicious code may totally erase or render useless any storage device (the previously mentioned second component) of its data in a manner so as to prevent even the most knowledgeable programmer being able to recover that data.

Malicious codes can also contaminate the system's central processor and memory (the first-mentioned component). However, in most cases, a simple power OFF or RESET will totally eradicate any malicious codes from these type of storage locations.

Practically all data storage devices, other than a Compact Disk ROM, are "read and write" devices. Therefore, one of the items desired is the ability to effectively prevent the write function whenever and wherever a computer's operational needs do not require the write function. That ability to prevent the write function should also have the capability of being accomplished in a manner that system operators and users can easily understand so that the level of protection will be effectively increased. In some applications, it may also be desirable to be able to prevent "read" access as well in particular areas that may require some limitation to the specific operating system or application system software for reasons of "restricting functionally" to only authorized tasks.

Many of the magnetic (tape or disk) storage devices have offered some kind of ability for "turning OFF" the "write" function. Large mainframe computers have used secondary memory devices in the form of tape and disk drives with it being quite usual to perform an operation which results in "reading" from one device and "writing" into another device at the same time. In these cases, the tape drives and disk drives have built-in circuits and a "write protect" switch at the hardware level that, by activation, prevents any accidental loss of data or corruption of program material while an operator is performing routine operating procedures. Built-in write protection has also been a standard feature on many mini-computers which enables an operator to quickly and totally protect program material from being lost or adulterated during some part of an operating procedure where a mishap might occur. This type of feature, however, has not been generally available on the majority of desktop computers. Furthermore, this type of feature does not include all the desired functions that are presently required. Some manufacturers have included a hard disk power OFF switch on Personal Computers but this feature has only been seen in laptops where battery conservation was the motive.

A "write protect" device also exists for floppy disk technology wherein the "write protect" device takes the form of a notch in a floppy disk's case, which notch can be covered with a removable adhesive tab (5.25" floppy) or a slider within the case of a 3.5" floppy disk to protect any data stored on that floppy disk. The floppy disk drive can sense (optically or mechanically) whether or not that notch is covered by the tab and, as a result, decide if that disk is "write protected". This technique will only guard against accidents in the nature of over-writing valuable data stored on a floppy disk.

A known write protect control circuit for computer's hard disk systems is described in U.S. Pat. No. 4,734,851. That circuit in U.S. Pat. No. 4,734,851 has data buses connected between a disk controller and two disk drive systems, which drives are also connected to the disk controller via a common control bus. That common control bus includes a first device "select wire" to select a first disk drive device and a second device "select wire" to select a second disk drive device. Only one of these device "select wires" can be selected (activated) at any one time by the disk controller to place one of the disk drives in a standby mode. That common control bus also includes a "write fault" wire which can be activated by either of the disk systems whenever a selected disk system cannot accept data being sent to it. Activation of the "write fault" wire informs the controller that the data was not written as requested. A "write gate" wire is also provided in the common control bus which provides a "write gate" enable signal whenever data is to be recorded on a selected disk. These are all common features which normally exist in personal computers. However, as described in U.S. Pat. No. 4,734,851, a "write protect" device is inserted in the "write gate" wire between the controller and disk drive devices with that "write protect" device being connected to both "device select" wires and the "write fault" wire of the common control bus. A switch associated with the "write protect" device can be activated to prevent any "write gate" enable signal from being applied to a selected disk drive device when that device is to be protected, i.e. when the switch is placed in a "protected mode" position. However, the "write protect" device will allow a "write gate" enable signal to be applied to a selected disk drive device when that device is unprotected with the switch being in the other "unprotected" position. When the "write protect" device prevents a "write gate" enable signal from reaching a selected disk drive, it also applies a signal to the "write fault" wire to inform the controller that no data has been recorded as requested by the controller. This type of "write protect" device only allows for a limited number of protective functions.

SUMMARY OF THE INVENTION

It is an object of the present invention to provide a write protection circuit for computer data storage devices which is simple to install and packaged in a compact form for use in a restricted space of a PC.

It is a further object of the present invention to provide a write protection circuit for computer data storage devices which can operate in a number of different modes providing a plurality of selectable protective features.

A write protect device for a computer, according to a first embodiment of the invention, comprising a switch connected to a circuit assembly that can be internally installed, the circuit assembly being provided with cable connections between data storage device drives of the computer and a drive controller cable from the computer's controller with the circuit assembly intercepting control lines used for drive selection and control, the switch being connected to inputs of a latch circuit in the circuit assembly wherein one position of the switch provides inputs to the latch circuit which result in generation of *READONLY and READONLY signals at two of the latch circuit's outputs, which outputs are connected to signal lines of the circuit assembly, a *READONLY signal line being connected to one input of a first NAND gate of the circuit assembly with another input of the first NAND gate being connected via an inverter to a *WRITE GATE line of the drive controller cable, the first NAND gate's output being connected to a *WRITE GATE line of a cable to the data storage device drives, a *READONLY signal on an input of the first NAND gate preventing any *WRITE GATE signal appearing at the output of the first NAND gate.

A write protect device for a computer, according to a further embodiment of the invention, wherein the latch circuit has a latch control pin connected to an output of a second inverter in the circuit assembly, the second inverter's input being connected to one terminal of a first three terminal connector with an electrical jumper being located between that one terminal and one other terminal of the three terminal connector, one of the other terminals being connected to ground and a second of the other terminals being connected to an output of a third inverter whose input is connected to a RESET line of the computer, the electrical jumper being connected to the terminal connected to ground allowing any changes to the latch circuit caused by a change in the switch position to take place immediately while the electrical connector being connected to the other terminal prevents any changes to the latch circuit output from taking place until after a reset of the computer.

BRIEF DESCRIPTION OF THE DRAWINGS

The invention will now be described in more detail with reference to the accompany drawings, in which.

DETAILED DESCRIPTION OF THE PREFERRED EMBODIMENTS

Figure 1:
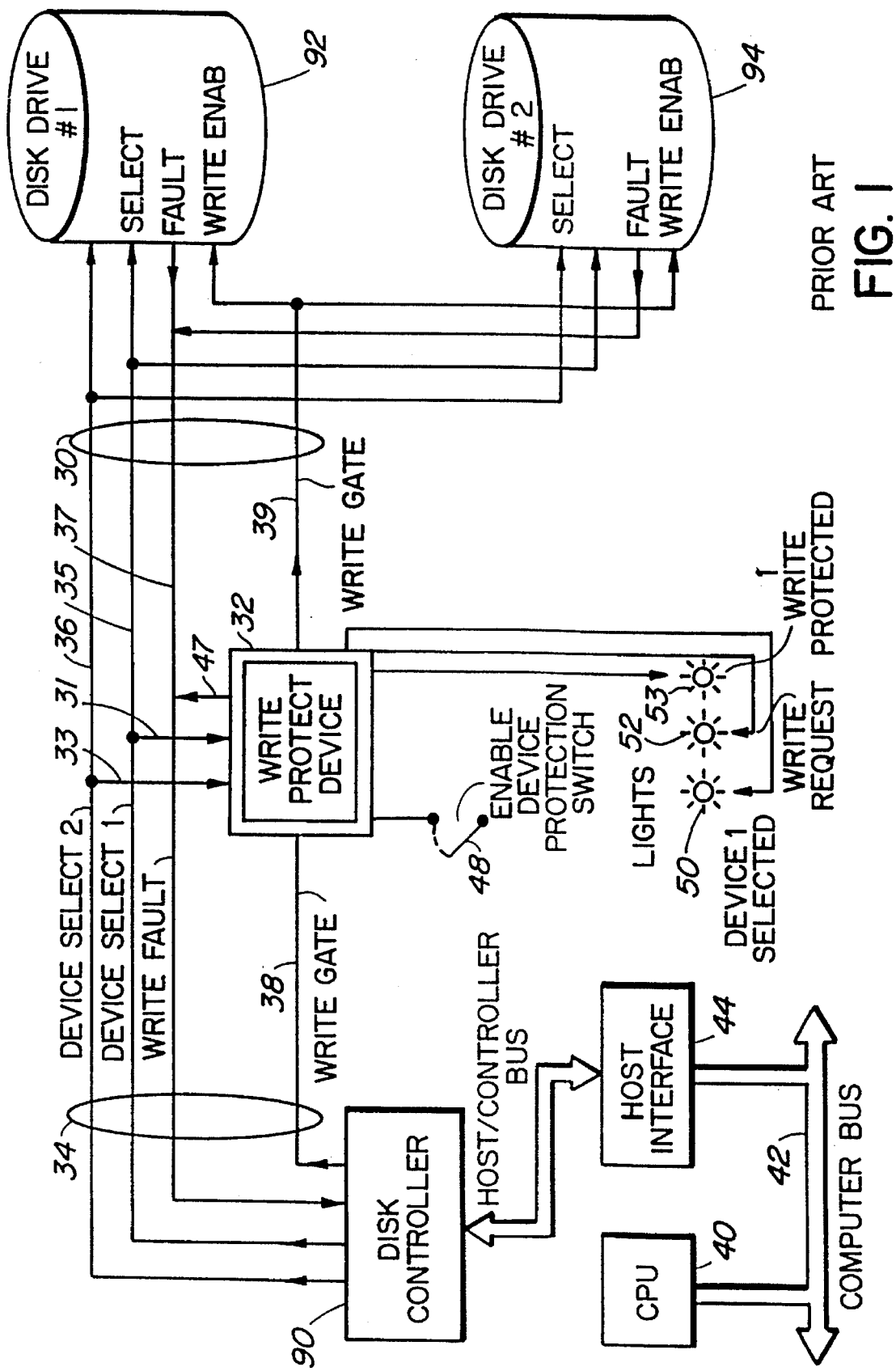
FIG. 1 is a block diagram of a write protect system described in U.S. Pat. No. 4,734,851 showing the interconnections between the write protect system and disk drives.
Figure 2:
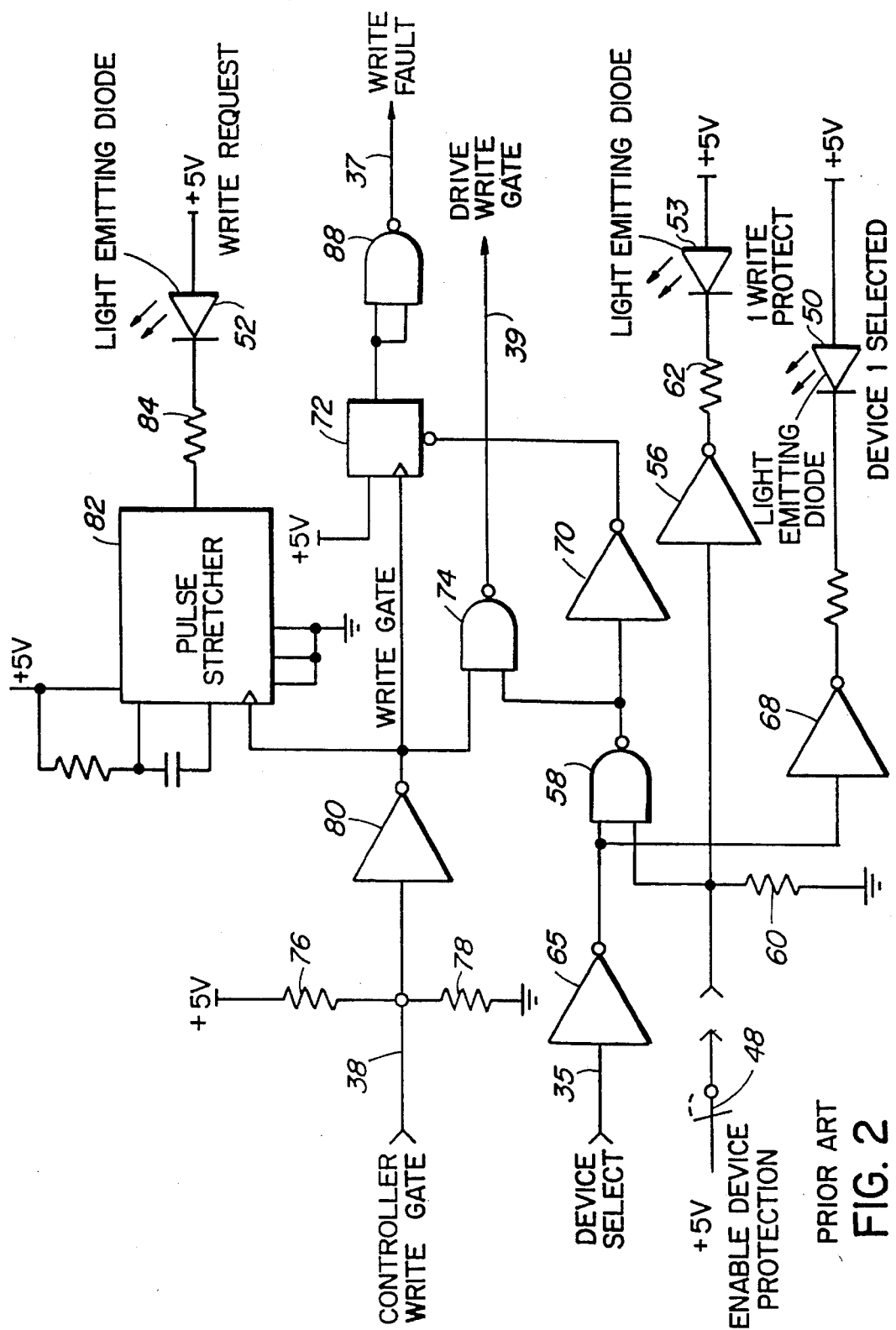
FIG. 2 is a circuit diagram of the write protect circuit described in U.S. Pat. No. 4,734,851.

One prior art type of a write protect control circuit described in U.S. Pat. No. 4,734,851 is illustrated in FIGS. 1 and 2. In this particular prior art device, a write protect device 32 is inserted in a common control bus 30 consisting of 2 device select wires 36 and 35, a write fault wire 37 and a write gate wire 38. A signal on device select wire 35 will select disk drive device 92 whereas one on device select wire 36 will select disk drive device 94 for activation and place the selected disk on standby. Only one of the disk select wires 35 or 36 is activated at any given time by disk controller 90 so that only one of the disk drive devices can be enabled at any one particular time.

The "write fault" wire 37 is one that is activated by either of the disk drive devices when, for any reason, a selected disk drive device cannot accept data being sent to it over a data bus. An appearance of a fault signal on the "write fault" wire 37 informs the disk controller 90 that the data was not written as requested. The write protect device 32 is connected by line 47 to the "write fault" wire 37 and is able to simulate a write fault signal.

The "write gate" wire 38 carries an enable signal which causes a selected disk drive to write data from a data bus. When select wire 35 is activated, for instance, the disk drive 92 is enabled and placed on "standby". Then if a signal also appears on the "write gate" wire, disk drive 92 will record whatever information is being sent over an information data bus. The "write gate" wire 38, with the "write protect" circuit in place, is split into two separate wires 38 and 39 with the write protect device 32 being inserted between those two wires so that any write gate enable signals on wire 38 must pass through the write protect device 32 to wire 39 before any data can be recorded. The write protect device 32 is coupled by wires 31 and 33 to device select wires 35 and 36 respectively in order to monitor the signals appearing on the device select wires 35 and 36. If an effort is made, in error, to write into a wrong disk drive at a time when it is protected, the "write gate" signal on wire 38 is prevented by the write protect device 32 from passing to wire 39 so that no data can be recorded. In addition, a signal is applied by the write protect device 32 over wire 47 to the "write fault" wire 37 to inform controller 90 that no data has been recorded.

A manual switch 48 is provided for device 32 which switch is operated whenever there is a need to "protect" or "unprotect" the disk drive 92. Another switch could also be provided if protection is also required for disk drive 94. Three lamps (50, 52 and 53), such as LED's, are provided to visually indicate when a protected disk drive is selected over one of the device select wires 35 or 36, when it is protected and when an effort is being made to write into it by a signal on the write gate wire 38. These lights 50, 52 and 53 provide a system for human supervision over write operations.

A circuit diagram for this write protect device 32 is shown in detail in FIG. 2. The protection switch 48 is activated (see also FIG. 1) whenever write protection is required for disk device 92. This will activate inverter 56 and, as a result LED light 53 to indicate that that associated disk drive device is "write protected". Resistor 62 limits current through the LED 53. The closure of switch 48 also applies power to the lower input of a two input NAND gate 58 with resistor 60 providing a bias voltage. If the disk controller 90 now attempts to write into the protected disk drive device 92, a signal will appear on the "device select" wire 35 and pass through the inverter 65 to the upper input of NAND gate 58. In this "protecting mode", that last-mentioned signal provides coincidence with the signal from switch 48 on the lower input of NAND gate 58 so that the NAND gate 58 will conduct. A signal will also be fed from the output of inverter 65, through inverter 68 to activate light LED 50. This LED 50 indicates that the protected device 92 has been selected by a signal on device select wire 35. The output of NAND gate 58 passes through an inverter 70 to remove the "inhibit" from latch circuit 72 which will allow the transmission of a write fault signal to "write fault" wire 37. The output of NAND gate 58 also applies a disable signal to a guard means which in this case is in the form of NAND gate 74. This circuit has now been placed in a condition in which it is prepared to intercept any write gate signal on wire 38 and to generate a write fault signal on wire 37.

If an undesired write operation is attempted, a signal will appear on the "write gate" wire 38 which activates an inverter 80 to change its state, the resistors 76 and 78 forming a voltage divider for applying an input bias to inverter 80. An output from inverter 80 is applied to the upper input of NAND gate 74. However, the output from NAND gate 58 to the other input of NAND gate 74 is disabling and prevents activation of NAND gate 74 so that the "write gate" signal on line 38 is not passed onto wire 39 and, as a result, will not enable writing on disk drive device 92.

The output from inverter 80 will also trigger a pulse generating circuit 82 which lights LED 52 in order to indicate that a "write request" has appeared on the write gate wire 38. In addition, the flip-flop 72 is activated in response to the output from inverter 80 with a fault signal being then transmitted through inverter 88 to write fault wire 37. That signal on the fault wire 37 informs the disk controller that the write operation in progress has failed. After the write sequence is finished, the controller 90 removes the "device select 1" signal on wire 35 which resets the flip-flop 72 via path 35, 65, 58 and 70 to terminate the "write fault" signal on wire 37. Therefore, any information transmitted over a data bus will not be written into the protected device disk 92 when switch 48 is closed even if a "device select 1" signal is present on wire 35.

If device 94 (a non-protected) device is selected for a write operation by a signal on wire 36, there will be no signal applied to wire 35. Therefore, inverter 65 and NAND gate 58 will not be activated and inverter 70 will apply an inhibit signal to flip-flop 72 which will disable the generation of any "write fault" signal. At this point, a "write gate" signal being applied by controller 90 to wire 38 will result in inverter 80 being activated to operate pulse generator 82 which activates LED 52 to indicate that a "write request" condition exists. Inverter 80 will also apply its output to the upper input of NAND gate 74 coincidental with an enable on the lower input causing NAND to apply a "drive write gate" signal on wire 39 to allow device 94 to record any data supplied over a data bus. The device 94 will, therefore, be write enabled and unaffected by the switch 48 being closed to provide a "write protected" state for device 92.

When the write protect circuit 32 is not activated, switch 48 being open, the bias voltage caused by resistor 60 will disable NAND gate 58 for the non-protecting mode of circuit 32 which will enable NAND gate 74. In this non-protecting mode, any "controller write gate" signal appearing on wire 38 will always create a "drive write signal" on wire 39. The inactive output of NAND gate 58, in addition, will pass through inverter 70 to reset flip-flop 72 to prevent it from generating a "write fault" signal on wire 37. Therefore, any write operation will be unaffected when write protect circuit 32 is in its non-protecting mode with switch 48 being in its open position.

Figure 3:
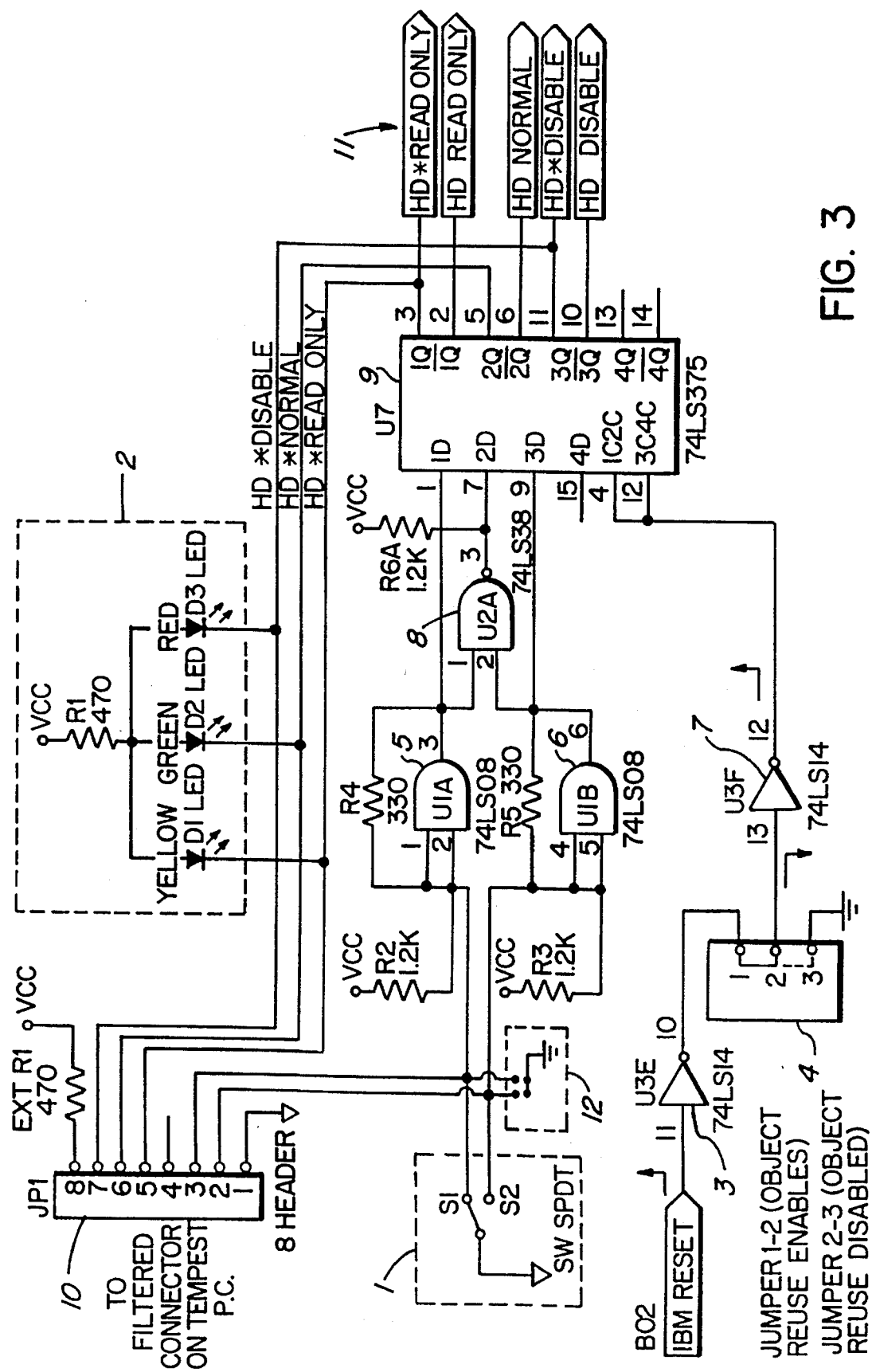
FIG. 3 is a circuit diagram of a switch control in a protect circuit according to the present invention.
Figure 4:
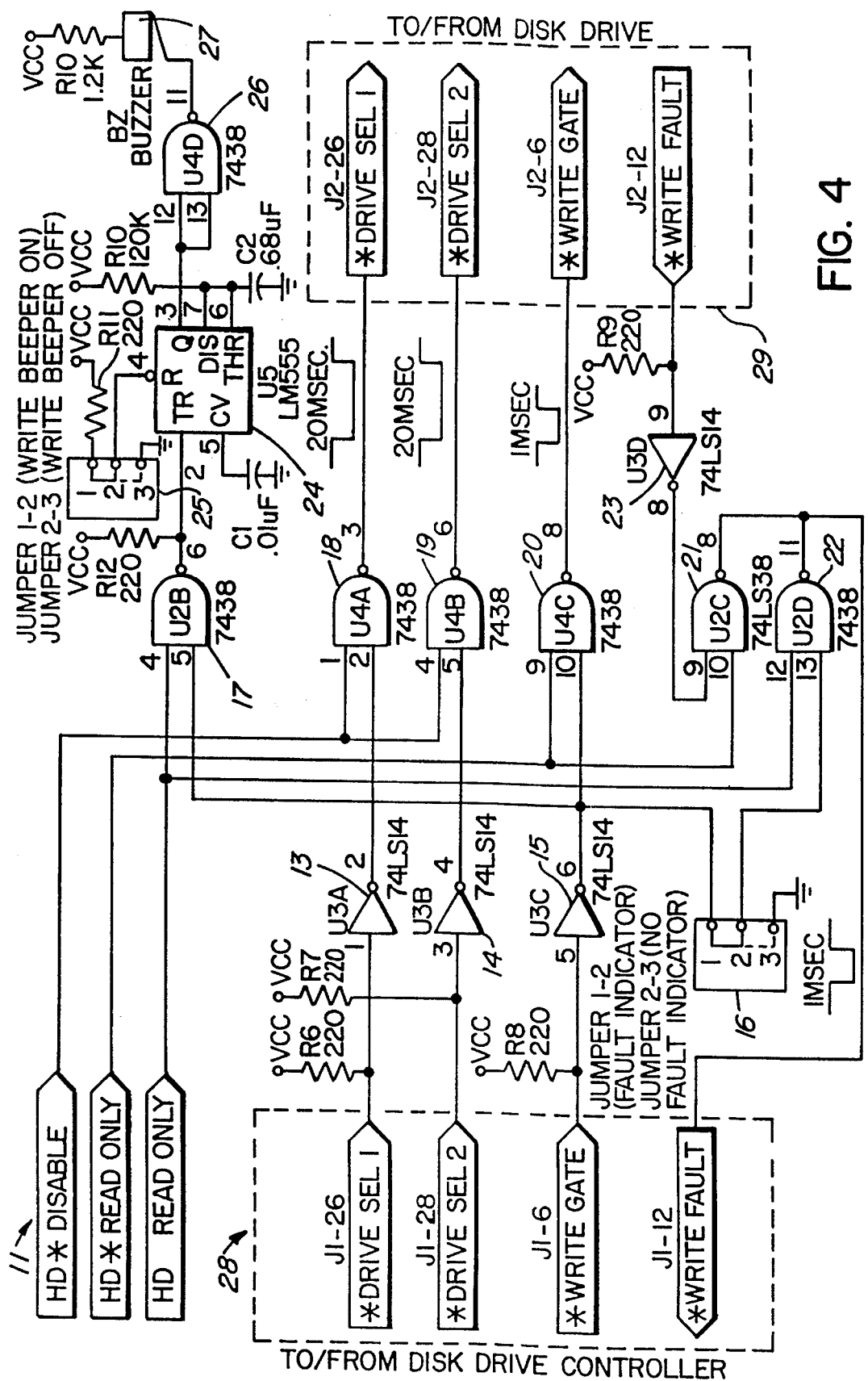
FIG. 4 is a circuit diagram of a write control circuit according to the present invention.

One "Hardware Protection Control for Computer Storage Devices" (HPCCSD) according to the present invention is illustrated in FIGS. 3 to 4. That device consists mainly of a circuit assembly comprising a single plug-in circuit card with an accompanying ribbon cable provided with a 34 pin cable connector. This arrangement can be easily installed by directly inserting it into a single slot in a personal computer backplane. The installation consists of disconnecting the 34 pin connector going to the hard disk drives and attaching it to the HPCCSD circuit card. This connects the cable originally from the controller to the disk drives to the circuit card. Then a 34 pin connector from the HPCCSD circuit card is connected to the hard disk drives. This installs the HPCCSD circuit between the controller cable and the disk drives with the HPCCSD circuit card intercepting all the control lines used for drive selection and control. Thus, this HPCCSD write protect device is packaged in a very compact form that would only consume one slot in the restricted space of a personal computer. It also provides a device which is relatively easy to install with no particular difficult modifications being required for the installation. Furthermore, it is possible that this type of write protect device could be combined with circuits on one of the other cards, e.g. a controller card, and/or that it may also be provided with additional functionality such as user ID and authentication and enhanced drive selection.

The HPCCSD circuit card intercepts all the control lines used for drive selection and control. Therefore, those control lines will be either disabled or enabled depending on the mode of the circuit selected, and on the configuration selected initially, for the HPCCSD circuit. A further advantage with this type of write protect device is that the HPCCSD circuit cannot be defeated by software of any kind since it is hardware based with all of the security features being set by either switches or internal links.

The internal links and switches for the HPCCSD circuit according to the present invention have the ability to prevent all "write" capacity except under special "administrative" circumstances that allow for adequate security control of all data but will also permit system changes with updates and entry of new information when required. The circuit is designed to have at least three, or more, modes of operation, those modes being:

(1) normal read and write both enabled;

(2) normal read enabled but with write disabled; and (3) both a disabled read and a disabled write feature.

Another mode of operation that could exist is one with the normal write enabled but with the read disabled. It should be noted that both modes (2) and (3) will prevent any infection by malicious codes. The circuit also contains means to prevent any changes made to the selected mode from taking effect until after a "reset" of the computer, i.e. after the computer is rebooted, or can be altered in design to allow any of those changes to take effect immediately and/or force reboot.

In addition to the circuit board, the HPCCSD circuit requires an externally mounted switch 1 and an externally mounted indicator display 2 which are illustrated inside of dotted lines in FIG. 3, FIG. 3 being a control circuit diagram for switch 1. The external switch 1 consists of a SPDT switch whose contacts are connected by leads to the internally installed HPCCSD circuit card through an opening in the personal computer case. The indicator display panel 2 consists of three LEDs (one yellow, one green and the other red) which are also connected by leads to the HPCCSD circuit board through openings in the PC case. The switch 1 and indicator display panel 2 can be mounted at the same location externally of the case. In the particular circuit illustrated in FIG. 3, the yellow D1 LED of display 2 is connected between a power supply Vcc and a HD *READONLY line of the circuit card so that it, when activated, will indicate when the HPCCSD circuit is in a read only mode. The green LED D2 of display 2 is connected between the power supply Vcc and a HD *NORMAL line to indicate when the HPCCSD circuit is in a normal mode while the red LED D3 is connected between supply Vcc and a HD *DISABLE line in order to indicate when the HPCCSD circuit is in a disable mode. The HD *READONLY, HD *NORMAL AND HD *DISABLE lines are connected to output pins 3, 5 and 11, respectfully of integrated circuit (IC) 9 whose input pins are connected to switch 1 via a number of gates. Integrated circuit 9 is a device such as a Motorola IC SN74LS375, commonly called a latch, which forms a latching circuit.

The leads between switch 1 and the HPCCSD circuit board as well as those between display panel 2 and that circuit board are also connected to a header 10 which is connected to a filtered connector on any TEMPEST designed and approved PC in order to prevent occurrence of any electromagnetic emissions from the PC such as might be created by leads connected to those externally mounted devices.

Output terminal S1 of switch 1 is connected to input pins 1 and 2 of AND gate 5 whose output pin 3 is connected to pin 1 of latching circuit 9. The input pins of AND gate 5 are also connected to a Vcc source through a resistor R2. The arm of switch 1 is connected to ground. Therefore, when the arm of switch 1 is switched to a position connecting it to terminal S1, it connects a ground to inputs of AND gate 5 causing those inputs to go low with a signal from output pin 3 of AND gate 5 being applied to pin 1 of latching circuit 9. The output pin 3 of AND gate 5 is connected to its inputs via resistor R4 and to the input pin 1 of NAND gate 8 whose output pin 3 is connected to pin 7 of latch 9. Resistors R2 and R4 act to form a passive debounce circuit to eliminate unwanted noise generated at terminal S1 of the switch 1. The other input pin 2 of NAND gate 8 is connected to the output pin 6 of AND gate 6 whose input pins 4 and 5 are connected together and to the other output terminal S2 of switch 1. The output terminal S2 is disconnected with the switch being in the position shown in FIG. 3. The input pins 4 and 5 of AND gate 6 are connected to its output pin 6 via a resistor R5 with that output pin of AND gate 6 being connected to input pin 9 of latch 9. The input pins 4 and 5 of AND gate 6 are also connected to a Vcc source via a resistor R3. Resistors R3 and R5 form a passive debounce circuit similar to that formed by resistors R2 and R4. Those resistors will also ensure that the switch makes active only one of the following modes: read only, normal or disable.

This circuit arrangement, with switch 1 connected to its terminal S1 as shown in FIG. 3, will provide a signal to inputs 1, 7 and 9 of latch 9 to activate the HD *READONLY and HD READONLY lines in cable 11 which are connected to output pins 3 and 2 of latch 9 provided that latch 9 is enabled, i.e. provided that the object reuse at latch control pins 4 and 12 of latch 9 is disabled. This will immediately place the computer into a read only mode and activate display LED D1 which is connected to the HD *READONLY line of cable 11. When switch 1 is switched to connect terminal S2 to the input terminals of AND gate 6, however, this will result in activation of HD *DISABLE and HD DISABLE lines in cable 11 which are connected to output pins 11 and 10 of latch 9. This will place the computer in a write disable and read disable mode and activate LED D3, which is connected to the HD *DISABLE line, to indicate that the computer is in a disable mode. It should be noted that an asterisked name, such as HD *DISABLE, is the inverse signal of the same non-asterisked name, i.e. HD DISABLE.

If the switch 1 is in a neutral position where neither terminal S1 or S2 are connected to the HPCCSD circuit board, latch 9 will activate the HD NORMAL line at pin 6 of latch 9 and also activate a HD *NORMAL line at pin 5 of latch 9 which is connected to LED D2 indicator light. This will activate LED D2 to indicate that the computer is in a normal mode. An optional connector 12 which can connect both terminals S1 and S2 of switch 1 to ground will disable circuits on the HPCCSD circuit card.

Latch control pins 4 and 12 of latch 9 are connected via an inverter 7 to an object reuse three terminal connector 4, inverter's 7 input being connected to a central connector of connector 4. A computer "RESET" line is connected to an input of inverter 3 whose output is connected to a first terminal of the three terminal connector 4 while a third terminal of connector 4 is connected to ground. An electrical jumper (internal option link) connected between the centre terminal of connector 4 to the third terminal (ground) will connect the inverter 7 input to the ground and disable the object reuse feature. The output of inverter 7 is connected to latch control pins 4 and 12 of latch 9 and will, under these conditions, enable latch 9 which will allow any changes in switch 1 to change the modes of the circuit (read only, normal or disable) immediately at the outputs of latch 9. The removal of the jumper between the centre and third terminal of connector 4 and its insertion between the first and second terminal will result in the output of inverter 3 being connected to the input of inverter 7 which will enable the object reuse feature. The output of inverter 7, under these conditions, will apply a signal to latch control pins 4 and 12 of latch 9 to disable its operation so that any changes made to switch 1 will not immediately affect the mode of the HPCCSD circuit. Therefore, any mode changes to the circuit will only occur after a "reset" or computer activated reset of the computer has taken place, i.e. after the computer is rebooted. A "computer activated reset" includes any one of a the following actions:

a. the reset button on a computer is activated to cause reboot;

b. the control + alt + delete keys are simultaneously depressed to cause reboot;

c. power is turned off and then on to reboot; or d. reboot is effected by a software command to reset.

When a computer is "reset", a pulse will be applied at the input of inverter 3. With the jumper being located between the first and second terminals of connector 4, that pulse will be inverted by gate 3, then re-inverted by gate 7 to appear at latch control pins 4 and 12 and enable latch 9. When latch 9 is enabled, the data present at its input pins 1, 7 and 9 will be stored at outputs 3, 5 and 11 of latch 9. The reset pulse will then become non-active, thus disabling latch 9 from accepting and storing any new data from its inputs 1, 7 or 9.

This will prevent any accidental changes in the switch 1 position from changing the mode of operation of the circuit during its normal operation.

The interconnection of the HPCCSD circuit board between disk drive controller cable 28 and the cable 29 which is connected to disk drives along with connections to the HD *DISABLE, HD *READONLY and HD READONLY lines of cable 11 are illustrated in FIG. 4. The HD *DISABLE line in cable 11 from pin 11 of latch 9 (FIG. 3) is connected to a first input of each of the NAND gates 18 and 19 of the HPCCSD circuit card. The *DRIVE SEL 1 line (J1-26) from the disk drive controller cable 8 is connected through an inverter 13 on the circuit card to a second input pin 2 of NAND gate 18 whose output pin 3 is connected to the *DRIVE SEL 1 line (J2-26) of cable 29. A signal on *DRIVE SEL 1 line from the drive controller will normally travel through inverter 13 and NAND gate 18, provided that no signal exists at pin 1 of gate 18, to the *DRIVE SEL 1 line of cable 29 to select a first disk DRIVE #1 of the computer and place that drive on standby. However, a signal from the HD *DISABLE line on input pin 1 of NAND gate 18 will disable that gate when a signal appears on its input pin 2 and block transmission of any drive select signal to disk DRIVE #1 which will prevent that drive from being selected or operated. This will occur when switch 1 (FIG. 1) is in a position where terminal S2 is contacted by the switch arm and will place the computer into a mode in which nothing can be "written into" or "read from" disk DRIVE #1.

In a similar manner, the *DRIVE SEL 2 line (J1-28) from the drive controller cable 28 is connected through inverter 14 and NAND gate 19, provided no signal exists at pin 4 of gate 19, to the *DRIVE SEL 2 of cable 29 to select a second disk DRIVE #2 of the computer and place it on standby. This will allow data to be "recorded on" or "read from" the second disk when a signal is on the *WRITE GATE (J2-6) line of cable 29. However, a signal from the HD *DISABLE line of cable 11 on input pin 4 of NAND gate 19 will block transmission of any drive select signal to disk DRIVE #2 and will prevent that drive from being selected. This will place the computer into a mode in which nothing can be "written into" or "read from" the second disk DRIVE #2. Since the HD *DISABLE line of cable 11 is connected to a first input of both NAND gates 18 and 19 in the circuit illustrated in FIG. 4, a signal on that HD *DISABLE line will prevent either drive from being selected. In this mode, no data can be "written into" or "read from" either of the disk drives. However, if the HD *DISABLE line was only connected to one of the NAND gates 18 or 19 on the circuit card, then only that one drive associated with the NAND gate connected to the HD *DISABLE line would be disabled by a signal on that line. Therefore, depending on the circuit card connections (internal links), either one of the disk drives could be placed in a disabled mode by switch 1 where nothing can be "written into" or "read from" that disk or both drives could be disabled as illustrated in the circuit of FIG. 4.

The HD *READONLY line of cable 11 is connected to a first input pin 9 of NAND gate 20 as well as to a second input pin 10 of NAND gate 21. The *WRITE GATE line (J1-6) of disk drive controller cable 28 is connected through inverter 15 to the other input pin 10 of NAND gate 20 whose output is connected to the *WRITE GATE line (J2-6) of cable 29. When no signal is on the HD *READONLY line of cable 11 and pin 9 of NAND gate 20, then a signal on the *WRITE GATE (J1-6) line of cable 28 will travel through inverter 15 and NAND gate 20 to the *WRITE GATE line (J2-6) of cable 29. This will allow data to be recorded on either one of the disk drives depending on which drive has been selected and placed on "standby". However, when a signal is present on the HD *READONLY line of cable 11 and applied to input pin 9 of NAND gate 20, this will disable that gate on the occurrence of a *WRITE GATE signal at pin 10 of gate 20 and block that *WRITE GATE signal from travelling to line J2-6 of cable 29. This will prevent any data from being recorded on either disk and place the computer into a read only mode which will occur when the switch 1 is switched to its terminal S1. This will also disable the "WRITE FAULT" line since that line from J2-12 of cable 29 passes through an inverter 23 to an input pin 9 of NAND gate 21 whose other input pin 10 is connected to the HD *READONLY line, a signal on both of those inputs disable gate 21 and block any *WRITE FAULT signal from cable 29. The inputs of inverters 13, 14, 15 and 23 are connected to a Vcc supply by resistors R6, R7, R8 and R9, respectively.

The *WRITE GATE line (J1-6) of cable 28 is also connected via inverter 15 to input pin 5 of NAND gate 17 whose other input pin 4 is connected to the HD READONLY line of cable 11. The NAND gate 17 will supply an output signal on pin 6 when a signal appears from inverter 15 in the *WRITE GATE line and the HD READONLY line. This output signal is applied to pin 2 of pulse stretcher circuit 24 which, if enabled, will generate a signal on pin 3 to NAND gate 26 to activate buzzer 27 from output pin 11 of NAND gate 26. The pulse stretcher circuit 4 will provide a long pulse out at its pin 3 when a short pulse is applied at its input pin 2. Circuit 24 may be a device such as a National Semiconductor LM555, commonly called a one-shot timer. That short pulse would originate at the output pin 6 of NAND 17 when a signal appears on the *WRITE GATE line of cable 28 and the HD READONLY line. This arrangement will provide an audio indication of a write attempt whenever a signal appears on the *WRITE GATE line provided pulse stretcher circuit 24 is enabled. However, pulse stretcher circuit 24 is provided with a reset pin 4 connected to a central terminal of a three terminal connector 25 which has a first terminal connected to a Vcc supply and a third terminal connected to ground. A jumper (internal option link) connected between the central terminal of connector 25 and its first terminal will connect the Vcc supply to pin 4 of pulse stretcher circuit 24 to enable it and allow the buzzer to operate when a *WRITE GATE signal appears and with the HPCCSD circuit being set in a read only mode. However, if the jumper is removed from the first and central terminal of connector 25 and placed between the central terminal and third terminal of the connector, this will connect reset pin 4 of pulse stretcher circuit 24 to ground, disabling the pulse stretcher circuit 24 and preventing the buzzer from operating when an output from inverter 15 is created by a signal on the *WRITE GATE line of cable 28. This results in no audio signal being provided when an attempt is made to write data on a disk in a read only or disable mode.

A signal from inverter 15 in the *WRITE GATE line of cable 28 is also applied to a first terminal of a three terminal connector 16 whose central terminal is connected to input pin 13 of NAND gate 22, the third terminal of connector 16 being connected to ground. Input pin 12 of NAND gate 22 is connected to the HD READONLY line of cable 11 with the output at pin 11 of NAND gate 22 being connected to the *WRITE FAULT line of cable 28. A jumper (internal option link) between the central terminal of connector 16 and its third terminal will connect input pin 13 of NAND 22 to ground and prevent any output signal from appearing at pin 11 of NAND gate 22. A signal on the HD *READONLY line of cable 11 applied to input pin 10 of NAND gate 21 will disable NAND gate 21 and prevent any *WRITE FAULT signal from the disk drive cable 29 reaching the disk drive controller cable 28. This arrangement, with a jumper between the central and third terminal of connector 16 and the HD *READONLY line activated, will completely disable the *WRITE FAULT line of the computer and place it in a Write Fault Disabled mode. However, during normal operation, with no signal on the HD *READONLY line to NAND gate 21, a write fault signal on the *WRITE FAULT line (J2-12) of cable 29 will travel through inverter 23 and NAND gate 21 to cable 28 and provide a write fault indication to the computer. This will provide, under a normal operation mode, a "write fault" indication to the computer whenever a disk drive cannot accept the data sent to it and indicate that the data was not written as requested.

Removing the jumper between the central and third (ground) terminals of connector 16 and placing that jumper between the connector's 16 first and central terminals will connect input pin 13 of NAND gate 22 to the output of inverter 15 in the *WRITE GATE line from cable 28. This will place the HPCCSD circuit in a Write Fault Enabled mode. In this latter mode, any signal on the *WRITE GATE line will be applied through inverter 15 to input pin 13 of NAND gate 22. This, with the HD *READONLY line activated and applying a signal to pin 12 of NAND gate 22, will result in a signal at output pin 11 of NAND gate 22 being applied the *WRITE FAULT line of cable 28. In this mode, any *WRITE GATE signal from cable 28 will cause NAND gate 22 to simulate a "write fault" signal on the *WRITE FAULT line (J1-12) to the computer. Therefore, this arrangement with the HPCCSD circuit in a "read only" mode will result in placing the HPCCSD circuit in a Write Fault Enabled mode where any signal on the *WRITE GATE line will simulate a "write fault" signal to the computer to indicate that no data was recorded on a disk as requested and that a write request was not completed.

The three terminal connectors 4 (FIG. 3), 16 and 25 (FIG. 4) are all located internally on the HPCCSD circuit board and their associated jumpers (internal option links) between two terminal of each connector can be set in desired configurations before the circuit board is installed in the computer. Those jumpers are considered as being selectable "internal option links" for the HPCCSD circuit.

The HPCCSD circuit as described, provides a number of different functions or modes which can be selected at will by installing jumpers between appropriate terminals of the three terminal connectors and by activation of the externally mounted switch. The types of modes that can be selected are listed below:

1. Mode selection (external switch)
   (a) Disk normal—Allows normal operation of the hard disk.
   (b) Disk read only—Allows only read attempts to the hard disk. All write attempts are disabled.
   (c) Disk disable—Disallows all read and write attempts to the hard disk. The hard disk is disabled.
or
Mode selection (internal link)
   (a) Disk normal—Allows normal operation of the hard disk.
   (b) Disk read only—Allows only read attempts to the hard disk. All write attempts are disabled.
   (c) Disk disable Disallows all read and write attempts to the hard disk. The hard disk is disabled.
2. Object reuse (internal link)
   (a) Object reuse enabled—Provides object reuse protection. All option changes will not take affect until after a reset of the computer.
   (b) Object reuse disabled—Disables object reuse protection. All option changes will take affect immediately after being set on option switches.
3. Drive activated (internal switch)
   (a) Drive 1 protected—Provides the selected mode of protection to hard drive 1.
   (b) Drive 2 protected—Provides the selected mode of protection to hard drive 2.
   (c) Drive 1/2 protected—Provides the selected mode of protection to hard drive 1 and drive 2.
4. Write fault indicator (internal switch)
   (a) Write fault enabled—Provides an indication to computer operating system that write did not occur.
   (b) Write fault disabled—Disables indication to computer operating system that write did not occur.
5. Write attempt indicator (internal switch)
   (a) Write audible indicator enabled.—Provides an audible indicator to operator that a write was attempted.
   (b) Write audible indicator disabled—Disables audible indicator to operator that a write was attempted.

Various modifications may be made to the preferred embodiments without departing from the spirit and scope of the invention as defined in the appended claims. For instance, although the descriptions of the preferred embodiments have generally been directed to hard disk (HD) drives, this HPCCSD circuit could be used for floppy disk drives or any other type of data storage devices located in a PC. Furthermore, although the switch has been described as an externally mounted switch, the switch could be internally mounted which would prevent easy access to it by unauthorized users. The switch could also be provided with a keylock and may be placed at a location which is separated from the computer along with the indicator display.

The embodiments of the invention in which an exclusive property or privilege is claimed are defined as follows:

1. A write protect device for a computer comprising a switch connected to a circuit assembly, which circuit assembly can be internally installed in the computer, the circuit assembly being provided with cable connections between a drive controller cable from a controller for the computer and at least one data storage device drive of the computer, the drive controller cable containing drive selection and control lines and the circuit assembly intercepting said lines, the switch being connected to inputs of a latch circuit in the circuit assembly wherein one position of the switch provides inputs to the latch circuit which results in generation of *READONLY and READONLY signals at two outputs of the latch circuit, said outputs being connected to *READONLY and READONLY signal lines, respectively, of the circuit assembly, a *READONLY signal line being connected to one input of a first NAND gate of the circuit assembly with another input of the first NAND gate being connected through a first inverter to a *WRITE GATE line of the drive controller cable, the first NAND gate having an output connected to a *WRITE GATE line to the at least one data storage device drive, wherein a *READONLY signal on an input of the first NAND gate prevents any *WRITE GATE signal appearing at the output of the first NAND gate and wherein a second position of the switch provides inputs to the latch circuit which result in generation of *DISABLE and DISABLE signals at two outputs of the latch circuit, said outputs of the latch circuit being connected to *DISABLE and DISABLE signal lines, respectively, of the circuit assembly, a *DISABLE signal line being connected to one input of a second NAND gate of the circuit assembly, another input of the second NAND gate being connected through a fourth inverter to a *DRIVE SEL line of the drive controller cable, the second NAND gate having an output connected to a *DRIVE SEL line of the cable to the at least one data storage device drive, a *DISABLE signal on an input of the second NAND gate preventing any *DRIVE SEL signal existing at the output of the second NAND gate.

2. A write protect device as defined in claim 1, wherein the latch circuit has a latch control pin connected to an output of a second inverter in the circuit assembly, the second inverter's input being connected to one terminal of a first three terminal connector with an electrical jumper being located between that one terminal and one other terminal of the three terminal connecter, one of the other terminals being connected to ground and a second of the other terminals being connected to an output of a third inverter whose input is connected to a RESET line of the computer, the electrical jumper being connected to the terminal connected to ground allowing any changes to the latch circuit caused by a change in the switch position to take place immediately while the electrical jumper being connected to the second terminal prevents any changes to the latch circuit output from taking place until after a reset of the computer.

3. A write protect device as defined in claim 2, wherein a second *DRIVE SEL line of the drive controller cable is connected via a fifth inverter and a third NAND gate to a further *DRIVE SEL line of the cable to the data storage device drives, one input of the third NAND being connected to the *DISABLE signal line, a *DISABLE signal on an input of the third NAND gate preventing any *DRIVE SEL signal existing at the output of the third NAND gate.

4. A write protect device as defined in claim 2, wherein a *WRITE FAULT line from the cable to the data storage device drives is connected via a sixth inverter to one input of a fourth NAND gate, a second input of the fourth NAND gate being connected to the *READONLY signal line from the latch circuit, the output of the fourth NAND gate being connected to the *WRITE FAULT line of the drive controller cable whereby a signal on the *READONLY line to the input of the fourth NAND will prevent any write fault signal being forwarded to the computer on the drive controller cable.

5. A write protect device as defined in claim 4, wherein a READONLY signal line from the latch circuit is connected to an input of a fifth NAND gate whose output is connected to the output of the fourth NAND gate and the *WRITE FAULT line of the drive controller cable, another input of the fifth NAND gate being connected to one terminal of a second three terminal connector with a second electrical jumper being located between that one terminal and one other terminal of the second three terminal connector, one of the other terminals of the second three terminal connector being connected to an input of the first NAND gate which is connected via the first inverter to the *WRITE GATE line of the drive controller cable, the electrical jumper being connected to said one of the other terminal of the second three terminal connector allowing the fifth NAND gate to simulate a write fault signal on the *WRITE FAULT line of the drive controller cable whenever a signal appears on the *WRITE GATE line of the drive controller cable and the READONLY line is activated, a further terminal of the second three terminal connector being connected to ground and, with the second electrical jumper connected to said further terminal, will prevent the fifth NAND gate simulating a write fault signal.

6. A write protect device as defined in claim 5, wherein the switch has a neutral position that provides inputs to the latch circuit that result in the generation of *NORMAL and NORMAL signals at two of the latch circuit outputs, each of the *READONLY, *NORMAL and *DISABLE outputs being connected to a respective signal line of a plurality of signal lines, each of said signal lines being connected to one input of a respective LED indicator display lamp of a plurality of LED indicator display lamps, said respective LED indicator display lamp having a further input connected to a voltage supply source, and the indicator display lamps being externally mounted in a display panel.

7. A write protect device as defined in claim 5, wherein the output of the first inverter in the *WRITE GATE line of the disk drive controller cable is connected to one input of a sixth NAND gate whose other input is connected to a READONLY line from the latch circuit, the output of the sixth NAND gate being connected to an input of a pulse stretcher circuit whose output is connected to an audio signal generator to provide an audio signal when the write protect device is in a read only mode and a signal appears on the *WRITE GATE line of the drive controller cable provided the pulse stretcher circuit is enabled.

8. A write protect device as defined in claim 7, wherein the pulse stretcher circuit is provided with a reset input pin which is connected to one terminal of a third three terminal connector with a third electrical jumper being located between that one terminal and one other terminal of the third three terminal connector, a first terminal of the other terminals of the three terminal connector being connected to a voltage supply and a second terminal of those other terminals being connected to ground, the third electrical jumper being connected to said first terminal activating the reset of the pulse stretcher circuit allowing the audio signal generator to be activated by an output from the pulse stretcher circuit and disabling the pulse stretcher circuit when the third electrical jumper is connected to the second terminal of the third three terminal connector which connects the reset of the pulse stretcher circuit to ground to prevent the audio signal generator from being activated.

9. A write protect device as defined in claim 1, wherein the switch is a SPDT switch with two output terminals and a switch arm connected to ground, each output terminal of the switch being connected to a voltage supply through a resistor and to both inputs of an AND gate whose output is connected to its inputs via a resistor to form a debounce circuit, outputs of each AND gate being connected to separate inputs of the latch circuit and to inputs of a further NAND gate whose output is connected to a voltage supply through a resistor and to a further input of the latch circuit.

10. A write protect device as defined in claim 9, wherein the latch circuit has a latch control pin connected to an output of a second inverter in the circuit assembly, that second inverter's input being connected to one terminal of a first three terminal connector with an electrical jumper being located between that one terminal and one other terminal of the three terminal connecter, one of the other terminals being connected to ground and a second of the other terminals being connected to an output of a third inverter whose input is connected to a RESET line of the computer, the electrical jumper being connected to the terminal connected to ground allowing any changes to the latch circuit caused by a change in the switch position to take place immediately while the electrical jumper being connected to the second terminal prevents any changes to the latch circuit output from taking place until after a reset of the computer.

11. A write protect device as defined in claim 10 wherein a second *DRIVE SEL line of the drive controller cable is connected through a fifth inverter and a third NAND gate to a further *DRIVE SEL line of the cable to the at least one data storage device drive, one input of the third NAND gate being connected to the *DISABLE signal line, and a *DISABLE signal on an input of the third NAND gate preventing any *DRIVE SEL signal existing at the output of the third NAND gate.

12. A write protect device as defined in claim 10, wherein a *WRITE FAULT line from the cable to the at least one data storage device drive is connected through a sixth inverter to one input of a fourth NAND gate, a second input of the fourth NAND gate being connected to the *READONLY signal line from the latch circuit, the output of the fourth NAND gate being connected to the *WRITE FAULT line of the drive controller cable whereby a signal on the *READONLY line to an input of the fourth NAND will prevent any write fault signal being forwarded to the computer on the drive controller cable.

13. A write protect device as defined in claim 12, wherein a READONLY signal line from the latch circuit is connected to an input of a fifth NAND gate whose output is connected to the output of the fourth NAND gate and the *WRITE FAULT line of the drive controller cable, another input of the fifth NAND gate being connected to one terminal of a second three terminal connector with a second electrical jumper being located between that one terminal and one other terminal of the second three terminal connector, one of the other terminals of the second three terminal connector being connected to an input of the first NAND gate which is connected via the first inverter to the *WRITE GATE line of the drive controller cable, the electrical jumper being connected to said one of the other terminal of the second three terminal connector allowing the fifth NAND gate to simulate a write fault signal on the *WRITE FAULT line of the drive controller cable whenever a signal appears on the *WRITE GATE line of the drive controller cable and the READONLY line is activated, a further terminal of the second three terminal connector being connected to ground and, with the second electrical jumper connected to said further terminal, will prevent the fifth NAND gate simulating a write fault signal.

14. A write product device as claimed in claim 13, wherein the switch has a neutral position that provides inputs to the latch circuit that result in the generation of *NORMAL and NORMAL signals at two of the latch circuit outputs, each of the *READONLY, *NORMAL and *DISABLE outputs being connected to a respective signal line of a plurality of signal lines, each of said signal lines being connected to one input of a respective LED indicator display lamp of a plurality of LED indicator display lamps, said respective LED indicator display lamp having a further input connected to a voltage supply source, and the indicator display lamps being externally mounted in a display panel.

15. A write protect device as defined in claim 14, wherein the output of the first inverter in the *WRITE GATE line of the disk drive controller cable is connected to one input of a sixth NAND gate whose other input is connected to a READONLY line from the latch circuit, the output of the sixth NAND gate being connected to an input of a pulse stretcher circuit whose output is connected to an audio signal generator to provide an audio signal when the write protect device is in a read only mode and a signal appears on the *WRITE GATE line of the drive controller cable providing the pulse stretcher circuit is enabled.

16. A write protect device as defined in claim 15, wherein the pulse stretcher circuit is provided with a reset input pin which is connected to one terminal of a third three terminal connector with a third electrical jumper being located between that one terminal and one other terminal of the third three terminal connector, a first terminal of the other terminals of the three terminal connector being connected to a voltage supply and a second terminal of those other terminals being connected to ground, the third electrical jumper being connected to said first terminal activating the reset of the pulse stretcher circuit allowing the audio signal generator to be activated by an output from the pulse stretcher circuit and disabling the pulse stretcher circuit when the third electrical jumper is connected to the second terminal of the third three terminal connector which connects the reset of the pulse stretcher circuit to ground to prevent the audio signal generator from being activated.

17. A write protect device as defined in claim 13, wherein the output of the first inverter in the *WRITE GATE line of the disk drive controller cable is connected to one input of a sixth NAND gate whose other input is connected to a READONLY line from the latch circuit, the output of the sixth NAND gate being connected to an input of a pulse stretcher circuit whose output is connected to an audio signal generator to provide an audio signal when the write protect device is in a read only mode and a signal appears on the *WRITE GATE line of the drive controller cable providing the pulse stretcher circuit is enabled.

18. A write protect device as defined in claim 17, wherein the pulse stretcher circuit is provided with a reset input pin which is connected to one terminal of a third three terminal connector with a third electrical jumper being located between that one terminal and one other terminal of the third three terminal connector, a first terminal of the other terminals of the three terminal connector being connected to a voltage supply and a second terminal of those other terminals being connected to ground, the third electrical jumper being connected to said first terminal activating the reset of the pulse stretcher circuit allowing the audio signal generator to be activated by an output from the pulse stretcher circuit and disabling the pulse stretcher circuit when the third electrical jumper is connected to the second terminal of the third three terminal which connects the reset of the pulse stretcher circuit to ground to prevent the audio signal generator from being activated.

\* \* \* \* \*